US009417326B2

(12) United States Patent
Niclass et al.

(10) Patent No.: US 9,417,326 B2
(45) Date of Patent: Aug. 16, 2016

(54) PULSED LIGHT OPTICAL RANGEFINDER (75) Inventors: Cristiano Niclass, Nisshin (JP);
Edoardo Charbon, Den Haag (NL);
Mineki Soga, Nisshin (JP); Hiromichi Yanagihara, Musashino (JP)

(73) Assignee: TOYOTA MOTOR EUROPE NV/SA, Brussels (BE)

( * ) Notice: Subject to any disclaimer, the term of this patent is extended or adjusted under 35 U.S.C. 154(b) by 0 days.

(21) Appl. No.: 13/376,336

(22) PCT Filed: Jun. 18, 2010

(86) PCT No.: PCT/EP2010/058652
§ 371 (c)(1),
(2), (4) Date: Dec. 5, 2011

(87) PCT Pub. No.: WO2010/149593
PCT Pub. Date: Dec. 29, 2010

(65) Prior Publication Data
US 2012/0075615 A1 Mar. 29, 2012

(30) Foreign Application Priority Data

Jun. 22, 2009 (GB) .................................. 0910717.8
Jun. 22, 2009 (GB) .................................. 0910744.2

(51) Int. Cl.
*G01S 17/89* (2006.01)
*G01S 7/481* (2006.01)
(Continued)

(52) U.S. Cl.
CPC ................ *G01S 17/89* (2013.01); *G01S 7/487* (2013.01); *G01S 7/489* (2013.01); *G01S 7/4816* (2013.01); *G01S 7/4818* (2013.01); *G01S 7/4863* (2013.01); *G01S 7/497* (2013.01)

(58) Field of Classification Search
CPC ....... G01S 7/487; G01S 17/107; G01S 17/89; G01S 7/4865; G01S 7/497

USPC ............ 356/3.01–3.15, 4.01–4.1, 5.01–5.15, 356/6–22, 28, 28.5
See application file for complete search history.

(56) References Cited

U.S. PATENT DOCUMENTS 8,072,595 B1 * 12/2011 Bastiaans et al. ............. 356/301
8,339,581 B2 * 12/2012 Guha et al. ................... 356/4.01
(Continued)

FOREIGN PATENT DOCUMENTS

EP     1 061 336 A2    12/2000
EP     1 780 912 A1     5/2007
(Continued)

OTHER PUBLICATIONS

Daniel G. Fouche, "Detection and false-alarm probabilities for laser radars that use Geiger-mode detectors", Applied Optics, Sep. 20, 2003, vol. 42, No. 27, pp. 5388-5398.
(Continued)

Primary Examiner — Luke Ratcliffe
(74) Attorney, Agent, or Firm — Sughrue Mion, PLLC (57) ABSTRACT An optical rangefinder based on time-of-flight measurement, radiates pulsed light toward an object (70), and receives reflected light from the object, the receiver operating in a photon counting mode, so as to generate a pulse for a detected photon. There is a variable probability of a photon detection on the receiver, and a controller (370, 380, 390; 365, 470, 475, 380, 390; 570, 580, 590, 390) controls the photon detection probability of the receiver, based on a light level. By controlling the detection probability according to a light level, the receiver can have an increased dynamic range, and without the expense of using optical components. This can apply even while detecting very weak signals since the receiver can still be in a photon counting mode while the detection probability is controlled. The light level can be indicated by an output of the receiver itself, or by another detector external to the receiver.

13 Claims, 5 Drawing Sheets (51) Int. Cl.
*G01S 7/486* (2006.01)
*G01S 7/487* (2006.01)
*G01S 7/489* (2006.01)
*G01S 7/497* (2006.01)

(56) References Cited

U.S. PATENT DOCUMENTS

| | | |
|---|---|---|
| 2005/0199812 A1* | 9/2005 | Shih .......................... 250/338.1 |
| 2005/0218301 A1 | 10/2005 | Hoashi |
| 2008/0246944 A1 | 10/2008 | Redman et al. |
| 2009/0185159 A1* | 7/2009 | Rohner et al. ............... 356/5.01 |
| 2009/0323047 A1* | 12/2009 | Karazi et al. ................. 356/4.01 |

FOREIGN PATENT DOCUMENTS

| | | | | |
|---|---|---|---|---|
| EP | WO2007/134730 | * | 11/2007 | .............. G01S 17/89 |
| JP | 01-2572899 A | | 10/1989 | |
| JP | 2003-130953 A | | 5/2003 | |
| JP | 2004-309234 A | | 11/2004 | |
| JP | 2006-322834 A | | 11/2006 | |

OTHER PUBLICATIONS

Japanese Office Action dated Jan. 21, 2014 issued in corresponding Japanese Patent Application No. 2012-516669, English Translation.

* cited by examiner

PULSED LIGHT OPTICAL RANGEFINDER

CROSS REFERENCE TOP RELATED APPLICATIONS

This application is a National Stage of International Application No. PCT/EP2010/058652 filed Jun. 18, 2010, claiming priorities based on British Patent Application Nos. 0910717.8, filed Jun. 22, 2009 and 0910744.2 filed Jun. 22, 2009, the contents of all of which are incorporated herein by reference in their entirety.

FIELD OF THE INVENTION

This invention relates to cameras and in particular to optical rangefinders, to methods of operating such rangefinders, and to receivers for use in such methods and to corresponding controllers. In particular the present invention can find advantageous use in automotive applications.

DESCRIPTION OF THE RELATED ART

It is known to provide an optical rangefinder based on TOF (Time Of Flight) in the form of a device to detect a distance by measuring a elapse time between illuminated light and reflected time. Though both reflected light (signal) and background light (noise) are detected, the signal component can be extracted by eliminating noise light with signal processing. For operation in outdoor or other bright conditions, a large dynamic range is required due to significant brightness difference between day time and night time. In order to achieve wide dynamic range, two methods of dynamic range expansion for a TOF based optical rangefinder are known. One is based on optics, and another uses automated sensitivity adaptation.

An example of a method based on optics involves adjustment of incident light with optical attenuator in front of a photo detector [ref 1]. Another example involves detection of separated lights using plurality of photo detectors [ref 2]. Furthermore, illumination with multiple laser sources with different powers is known [ref 3].

With the method of ref 1, in the case of monolithic array of photo detectors, incident light into each photo detector cannot be controlled independently. Thus, it is impossible to expand the dynamic range of whole the monolith array. The method of ref 2 can expand the dynamic range, even in the case of a monolithic array, however complicated and costly optics for separating light are required. The method of ref 3 can expand the dynamic range of signal component by changing the power of laser source, however the dynamic range of sunlight, which is independent of laser power, can not be expanded. Examples of methods based on automated sensitivity adaptation include switching between photon count mode and analog mode by changing reverse bias voltage [ref 2], and adjustment of reverse bias voltage based on output of avalanche photodiode [ref 4][ref 5], have been published. Although the method of ref 2 can easily switch the mode by changing reverse bias voltage, the system is complicated due to needing two different kinds of signal processing for the different modes. With the method of ref 4 and ref 5, very weak signals, such as single photons, can not be detected due to analog measurement mode. In the case of 2D monolithic array of photo detectors, diverged beam is transmitted to a target and then reflection from far target is very weak. Such very weak signal can not be detected with the analog measurement. An example of a lower cost 3-D image sensor in CMOS using single photon avalanche diodes is shown in ref 6. A number of TOF measurements are taken and processed in hardware or software. A histogram is built up and noise is removed by a threshold operation. A depth value is based on an average of many measurements, 10,000 measurements in the example given. Mean optical power used was 750 µW.

REFERENCES

[ref 1] Japanese patent, publication number JP,2000-002765,A
[ref 2] Japanese patent, registration number JP,2820095,B
[ref 3] Japanese patent, publication number JP,2000-206246,A
[ref 4] Japanese patent, publication number JP,01-257289,A (1989)
[ref 5] Japanese patent, publication number JP,2007-078424,A
[ref 6] C. Niclass A. Rochas, P. A. Besse, and E. Charbon, "Design and Characterization of a CMOS 3-D Image Sensor Based on Single Photon Avalanche Diodes", IEEE Journal of Solid-State Circuits, vol. 40, n. 9, September 2005.

SUMMARY OF THE INVENTION

An object of the invention is to provide alternative cameras and in particular optical rangefinders, methods of operating such rangefinders, and receivers for use in such methods and to corresponding controllers.

According to a first aspect, the invention provides:

An optical rangefinder based on time-of-flight measurement, has an illumination device radiating pulsed light toward an object, and a light receiver arranged to receive light from the object, the receiver operating in a photon counting mode, so as to generate a pulse for a detected photon or group of photons, there being a variable probability of a photon detection at the receiver, the receiver having a controller to control the photon detection probability of the receiver, based on the light level.

By controlling the detection probability according to a light level, the receiver can have an increased dynamic range. This can apply even while detecting very weak signals since the receiver can still be in a photon counting mode while the detection probability is controlled. This can apply even while being subject to heavy sunshine, since the photon detection rate of the receiver can be lowered, so as to prevent saturation. Besides, reflective power from an object depends on distance and reflectivity of the object. Methods and apparatus according to the present invention can operate independently of such object properties. Embodiments of the present invention can be simpler and cheaper than using optical components to increase the dynamic range. The light level can be indicated by counting an output of the receiver itself during a predefined duration, or by another detector external to the receiver, or in any other way.

Advantages of embodiments of the present invention include a significant improvement of dynamic range of an optical rangefinder such that dynamic range need not be a limitation any longer.

Embodiments of the invention can have any other features added, some such additional features are set out in dependent claims and described in more detail below.

Another aspect provides a corresponding method of using a receiver to receive pulsed light from an object generated by transmitting pulsed light towards the object, the method having the steps of operating the receiver in a photon counting mode, so as to generate a pulse for a detected photon or group of photons, there being a variable probability of a photon detection on the receiver, controlling the photon detection probability of the receiver, based on the light level.

Another aspect provides a corresponding controller suitable for use in the above method of operating a receiver, whereby pulsed light is transmitted to an object and pulsed light is received from the object, the controller being adapted to operate the receiver in a photon counting mode to generate a pulse for a detected photon or group of photons, there being a variable probability of a photon detection on the receiver, the controller having an input to receive a signal indicating a light level, e.g. as well as any kind of noise level, and being arranged to control the photon detection probability of the receiver, based on the signal of the receiver. Since a breakdown voltage of an avalanche photodiode is sensitive to temperature, photon detection probability, as well as dark count rate, could fluctuate, especially for an automotive application. This effect can be compensated for by controlling photon detection probability based on output of the receiver, indicating the signal (light) level and, e.g. any kind of noise level, such as sun light and dark count. Accordingly, one of the important advantages of the present invention is to compensate for fluctuation of APD properties. These can be compensated at a time with the light level adjustment by monitoring output level of the receiver.

Any of the additional features can be combined together and combined with any of the aspects. Other advantages will be apparent to those skilled in the art, especially over other prior art.

BRIEF DESCRIPTION OF THE DRAWINGS

How the present invention may be put into effect will now be described by way of example with reference to the appended drawings, in which.

DESCRIPTION OF THE PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

At least some of the embodiments involve an optical rangefinder based on time-of-flight measurement, comprising an illumination device radiating pulsed light repeatedly toward an object, and a light receiver operating in photon counting mode. The receiver generates a pulse for each detected photon or for a group of photons. It also includes a controller to control photon detection probability of the said receiver, based on output of the receiver, or on some other indication of light level. An optical rangefinder in accordance with embodiments of the present invention, is capable of expanding dynamic range without additional optical components, because it controls photon detection probability based on output of the receiver. And it is capable of detecting a very weak signal from distant target, because it can operate with photon count mode. An optical rangefinder with wide dynamic range can be achieved without additional optical components. It is capable of measuring long distances with relatively low laser power, with a compact electronic circuit.

Additional Features:

Some additional features are as follows:

The optical rangefinder described can also include a device to compare the pulse number with a fixed threshold. In case the comparison yields a positive output (i.e. the pulse number is higher than the threshold), then the photon detection probability of the detector is reduced. If the output is negative (i.e. the pulse number is lower than the threshold), then the photon detection probability of the detector is increased.

This is capable of keeping photon count rate constant by comparing pulse number with a predefined threshold. Thus it can expand dynamic range with simple architecture.

The optical rangefinder has a light receiving component for receiving light in a photon counting mode and also has means for adjusting the photon detection probability. For example, the optical rangefinder can have an avalanche photo diode, and the controller can control the photon detection probability by changing a reverse bias voltage of the avalanche photo diode. This is capable of adjusting photon detection probability with a relatively simple architecture, because it utilizes avalanche photo diode as the receiver and controls photon detection probability by changing a reverse bias voltage.

The optical rangefinder can have a memory device or buffering device, such as a shift register, for storing the existence of a pulse from the receiver during a predefined duration in each bit. Further the rangefinder has a counter for counting a number of the pulse denoting pulse existence, e.g. by counting the number of the bit in the shift register, denoting pulse existence, and a comparator comparing output of the counter with a threshold.

In the optical rangefinder, N bits each indicating existence or otherwise, of a pulse per unit time are stored in the memory or buffering device, e.g. in an N bit shift register, and they are updated every unit time. Since necessary information for controlling photon detection probability is acquired every unit time, the rangefinder according to embodiments of the present invention is capable of controlling photon detection probability more rapidly.

The optical rangefinder can have a differential counter incrementing a count number when the pulse from the receiver is input, decrementing a count number at intervals of a predefined duration. The current count number may be stored in a memory device, e.g. in a register. In this way a difference between output level of the receiver and predefined level is stored as the counted value of the differential counter. Since the memory device does not need to be a shift register, photon detection probability can be controlled more rapidly and with a relatively compact circuit.

Figure 1:
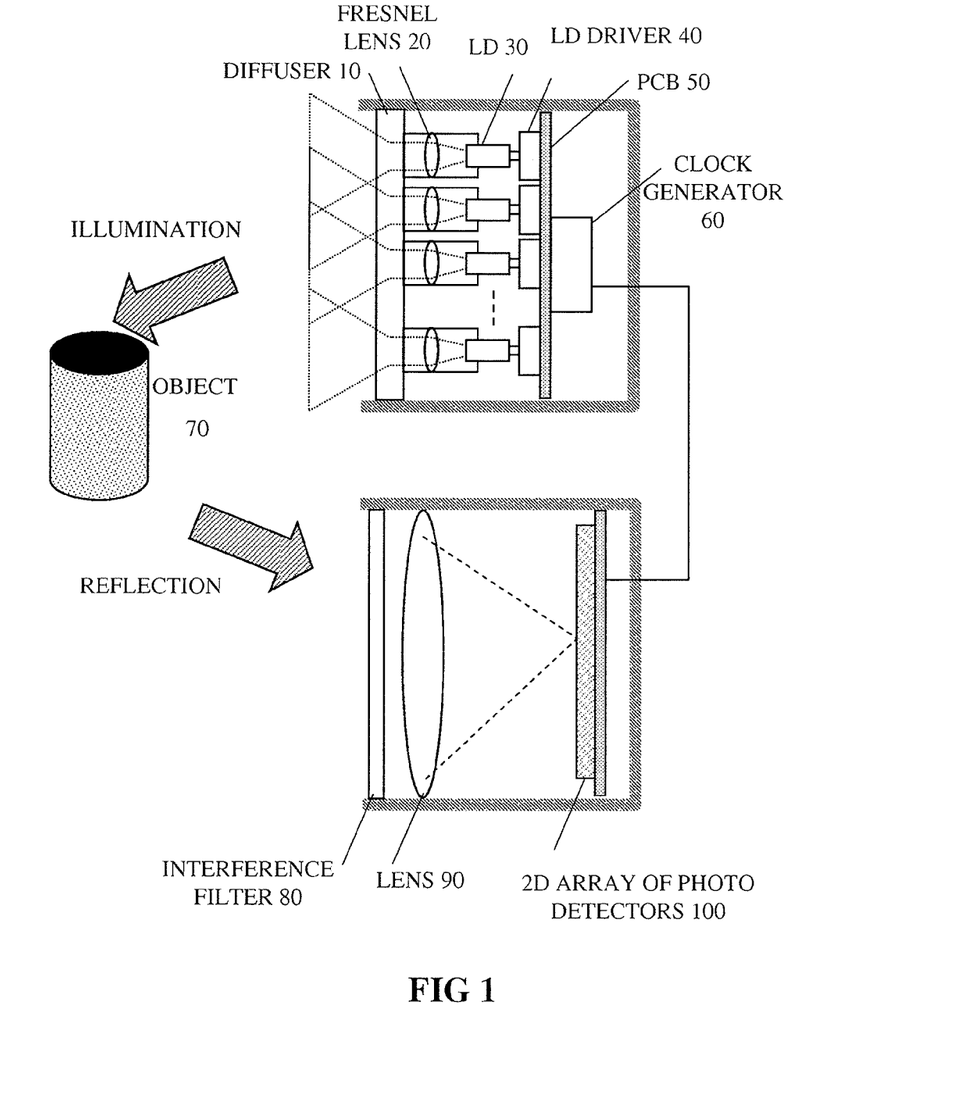
FIG. 1 shows a view of illuminating and receiving parts of an optical rangefinder according to an embodiment.

FIG. 1, Illuminating and Receiving Parts of an Optical Rangefinder According to an Embodiment.

There are two types of a laser rangefinder, a scanning type and a non-scanning type. Either type can be used in embodiments of the invention. The scanning type transmits collimated laser light repetitively with scanning to a target, and detects a reflection with a single photo detector. Due to collimated light, power density on the target surface can be enhanced, and consequently optical SNR is high. In order to acquire a range map with high spatial resolution, a time-consuming scanning with small pitch is required. In the case of a typical automotive application, in which real time measurement is required, a beam is scanned with small pitch horizontally and there are only several vertical scanning layers to shorten measurement time. On the other hand, the non-scanning type transmits diverging light, typically covering the whole target object at once, and a reflection is detected with a 2D focal plane array of photo detectors. Due to capability of multi-point measurement with a single illumination, there can be advantages of higher spatial resolution and faster measurement. In contrast, it is more important to suppress background light, such as sunlight, because power density on target surface is lower due to the diverging beam. In order to suppress background light, both transmitted light (signal) and background light (noise) need to be detected without the detector becoming saturated. Thus a large brightness dynamic range is preferred, particularly under outdoor conditions, where there is significant brightness difference between day and night or between sunlight and shadow (e.g. between open road and a tunnel).

The non-scanning type rangefinder comprises an illumination part and a detector part. FIG. 1 shows a configuration of the rangefinder which can be an embodiment of the invention. It shows an illuminating part in an upper half of the view, and a receiver part in a lower half. In the illuminating part, a clock generator 60 is provided, to drive the pulses of light. This is mounted on a printed circuit board PCB 50. Alternatively, some electronic components can be integrated into a single chip. A number of laser diodes LD 30 are provided, along with associated LD driver parts 40 for making pulses of light. The light from the LDs is passed through for example a lens such as a Fresnel lens 20 and a diffuser 10 before being transmitted to the target object 70. Reflections are picked up by the receiver parts, and pass through an interference filter 80, and lens 90, before reaching a 2D array of photo detectors 100. The array is shown in more detail in FIG. 2. Receiver circuitry for detecting and processing the light from the 2D array will be described in more detail below. Other receiver embodiments need not have a 2D array, for example they could have a single detector or line of detectors.

Figure 2:
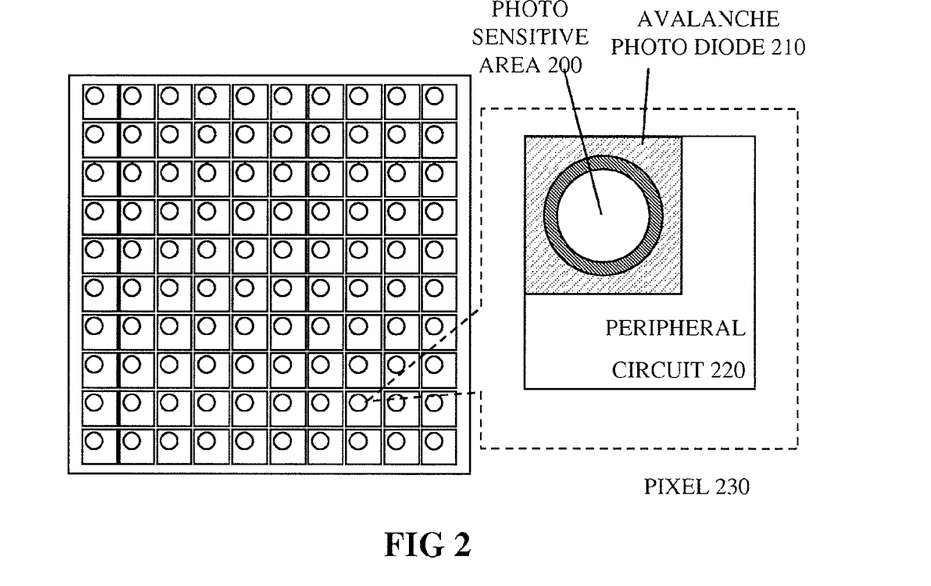
FIG. 2 shows a view of a 2D array of photodetectors, with an expanded view of one of the pixels, for the embodiment of FIG. 1 or other embodiments

FIG. 2, 2D Array of Photodetectors, with an Expanded View of One of the Pixels

As can be seen in FIG. 2, an embodiment of the present invention makes use of an array of detectors. One of the detectors is expanded. Each pixel of the 2D photo detector array has an APD (Avalanche Photo Diode) 210 and a peripheral circuit 220. The APD has a photo sensitive area 200, circular in the example shown, though other shapes can be envisaged.

Figure 3:
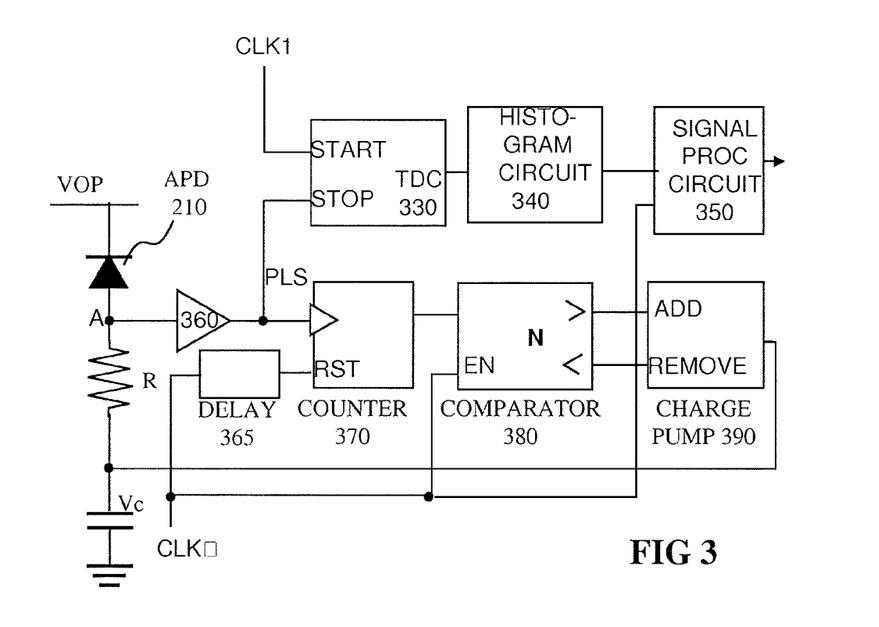
FIG. 3 shows a configuration of a receiver for one of the pixels according to an embodiment.

FIG. 3, Configuration of a Receiver for One of the Pixels

FIG. 3 shows a configuration of an each pixel element. The APD 210 is shown coupled to a supply VOP. Another end is coupled to ground through a node A, resistor R and a capacitor C. An output from node A is fed through a buffer 360 to the peripheral circuit 220. The peripheral circuit is comprised of a TDC (Time to Digital Converter) 330, a histogram circuit 340, and a signal processing circuit, 350, coupled in series. The output from the buffer is also fed to a counter 370, a comparator 380, and a charge pump 390 coupled in series. The clock generator (not shown) provides a CLK1 with period T and CLK2 with period MT. CLK1 defines a pulsed timing of the LD array and CLK2 defines a timing, when the signal processing starts calculating distance after the M pulsed illumination. CLK1 is provided to the LD array and the 2D photo detector array, and the CLK2 is provided only to the 2D photo detector array. The CLK1 provided to the LD array is distributed to each LD driver and then each LD is emitted. The laser can be replaced with other light source, such as LED, which should form short pulse to enhance accuracy of TOF. Laser light is preferable rather than LED, due to fast response and narrow spectral band width. However, LED can be applied.

The present invention will mainly be described with reference to laser although the present invention is not limited thereto.

The laser emission is parallelized/collimated with a lens such as the Fresnel lens and then diffused with the diffuser, and transmitted toward the target. A diffuser has its own characteristic defining beam divergence angle of incident light. The emission from each LD can be integrated and may form a cone beam. The target is illuminated with this cone beam and the reflection is detected with the 2D array of photo detectors at a time. Thus, a range map can be acquired with high spatial resolution. Another advantage of utilizing a diffuser is to enlarge a size of an "apparent source". The "apparent source" is terminology defined in IEC standard of laser safety, and is defined as the real or virtual object that forms the smallest possible retinal image. Assuming constant laser output power, a larger apparent source is preferable for eye safety. Eye safety can be ensured by enlarging the apparent source by utilizing the diffuser.

The light reflected on the target passes through the interference filter and the lens, and forms an image on the array of the photo detectors. The incident light focused on the array is detected with the APD. Only a specific wavelength or range of wavelengths of the incident light can be passed through the interference filter. By adjusting laser wavelength and the transparent band of the filter, most of background light can be blocked. Though a typical laser band width is several nm, a center of wavelength could be shifted due to temperature fluctuation. In order to guarantee operation under wide temperature condition, a pass-through or transparent band of the filter is preferably broadened to greater that 10 nm and is typically tens of nm. Therefore, background light cannot be completely blocked, and it is necessary in some embodiments to suppress the background light by signal processing.

An APD is a type of photo diode, which supports a high electric field. There are two modes of avalanche operation, one is linear mode in which a reverse bias voltage is a little less than breakdown voltage, and the other mode is Geiger mode in which the reverse bias voltage is higher than the breakdown voltage. When a photon is incident to the APD, a pair of a hole and an electron is generated and is accelerated with the high electric field. By impact of the accelerated hole and electrons, another electron hole pair is generated one after another like an avalanche. In the linear mode operation, a generation ratio is less than an evaporation ratio and the avalanche can be stopped by itself. Since output current is proportional to incident light, a power of incident light can be measured. In contrast to the aforementioned Geiger mode which operates in a digital form, the linear mode operation is analog and is thus called analog measurement. In the Geiger mode operation, a single photon can trigger the avalanche phenomena, which can be stopped by lowering the reverse bias voltage down to the breakdown voltage. This operation of stopping the avalanche is called quenching. The simplest quenching circuit can be implemented by a resistance R in series with the APD. The avalanche current causes a voltage increase of the resistance, as well as a bias voltage drop of the APD. Thus, the avalanche current can be stopped due to the bias voltage drop. With this quenching circuit, incident photons can be detected and counted as voltage pulses. The Geiger mode is called photon count mode. The present invention is not limited to an APD. For example, an alternative is a PMT (Photo Multiplier Tube). Also the present invention is not limited to detecting individual photons. Since 100% of the photon detection probability is theoretically impossible, actually groups of photons can trigger an avalanche, e.g. groups of 5 photons can trigger one avalanche on average, in the case of 20% photon detection probability.

Sensitivity of the linear mode can be expressed by QE (Quantum Efficiency) and dark current. The QE is defined as percentage of generating hole-electron pair per one incident photon. Dark current is current flowing even when no photon is incident, and is minimum level of thermal noise. NEP (Noise Equivalent Power) can be calculated from the QE. For example, when dark current is 100 nA, QE is 50%, and electric charge of single electron is $1.6\times10^{-19}$ Q, NEP is 50 [nA]/$1.6\times10^{-19}$/0.5=$1.25\times10^{12}$ [Photon/sec]. On the other hand, sensitivity of a photon counter can be expressed by photon detection probability and dark count rate. When a Geiger mode APD is not quenched, the avalanche current continues to flow and thus QE is infinite. When a Geiger mode APD is quenched, the generation of avalanche pulse is a probabilistic phenomenon in terms of incident photons, and the probability is called photon detection probability. Like dark current in the linear mode, an avalanche pulse could be thermally triggered in the Geiger mode, and the frequency of the avalanche pulse is expressed as dark count rate. In this embodiment, the APD is operated in the Geiger mode. Recently, Geiger mode APD's made in CMOS processing technology have been developed, and low cost implementations of 2D arrays have been enabled [ref 6]. Electronics in each pixel, such as TDC, histogram circuit, signal processing circuit, counter, comparator, and charge pump can be implemented in a single chip using the same CMOS process.

The CLK1 and CLK2 are distributed to the TDC and the counter. Operation of each pixel, after photon arrival to the APD, will be explained using FIG. 3. When an avalanche current is triggered by photon arrival, the potential of the node A goes high. With this potential elevation, a pulse is generated through the buffer and output to the TDC and the counter. The TDC measures duration elapsed between CLK1 to PLS, and outputs it as digital value. If the PLS is not observed, then a default maximum value is output. The histogram circuit increments a memory whose address corresponds to the TDC output to thereby bin the output value. When the TDC output is the default maximum value, then no memory is incremented. After repeating M cycles of CLK1, at the timing of CLK2, histogram memories are loaded to the signal processing circuit, and the TOF is calculated based on the address of a memory in which a maximum value is stored. The TOF from each pixel can be sequentially read out from the array through read-out circuitry not shown, following established practice which need not be described in more detail.

Figure 4:
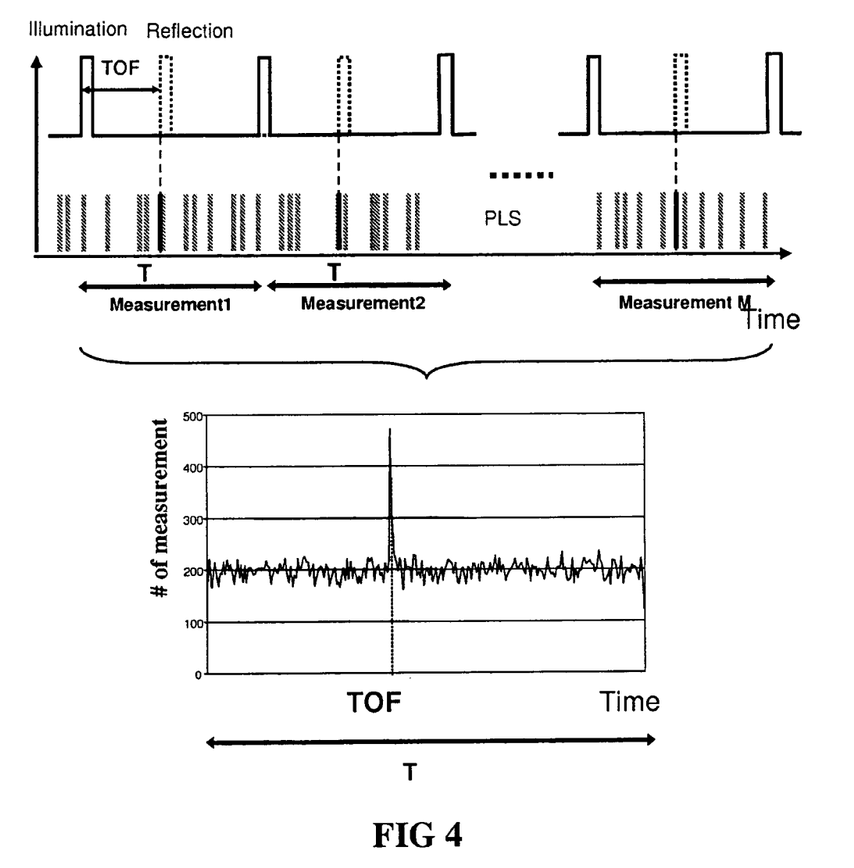
FIG. 4 shows a timing chart of illumination, reflections and detected pulses for determining a time of flight according to an embodiment.

FIG. 4 Timing Chart of Illumination, Reflections and Detected Pulses

As was mentioned before, background light can often not be completely blocked by the interference filter, so the detected photons include both transmitted light (signal) and background light (noise). An optional, suppression of background light will be explained using FIG. 4. Assuming no movement of the rangefinder and the target during the measurement, when laser light is repetitively transmitted and detected, the detection timing is constant. Thus, TOF can be identified statically from a large number of repetitive measurements. When a histogram is made from a large number (M) of measurements, the histogram has a peak at the time of the TOF, i.e. one or more adjacent bins are fuller than the others. Because photon arrival time of background light is not correlated with the CLK1 (laser transmittance), the measurement is distributed evenly in the histogram. By extracting a peak position in the histogram with the signal processing circuit, true TOF can be identified, and effects of background light can be suppressed. An example of such a histogram is shown in FIG. 4 and comprises actual measurement results when the optical SNR is 0.01. It can be understood that histogram peak can be robustly extracted even in the case of very low SNR. TOF is measured independently at each pixel, thus a 2D depth map can be obtained from the TOFs.

In this embodiment, the simplest way of peak extraction has been described, though other methods are also possible for the peak extraction in accordance with the present invention. For example, a maximum value can be searched after smoothing bins. This smoothing can enhance robustness against fluctuation of bins, when width of a bin is small. It is also effective to extract a centroid after roughly identifying a peak position.

In order to correctly identify a peak position with the above mentioned histogram processing, a sufficient number of measurements is required. Averaged photon detection number could be statistically fluctuated, and the variance is called photon shot noise. The shot noise conforms with the Poisson distribution, and its variance is equal to the square root of the detection number. Accuracy of peak extraction is deteriorated by the shot noise, especially when the detection number is small. When a position of a maximum value bin is searched for, the fluctuation can be expressed as Sqrt(Ns) where Ns denotes the value of the maximum bin. Assuming Ns is 100, the fluctuation is 10 and thus SN is 10. Assuming Ns is 10000, the fluctuation is 100 and thus SN 100. It can be understood that the robustness of peak extraction depends on the number of measurements. Also, detection of a distant target is disadvantageous due to the smaller number of photons arriving.

A problem of a too high photon count rate (or short photon count cycle) will be considered below. An APD in Geiger mode has a dead time in which no photon can be detected. As was mentioned before, reverse bias voltage has to be increased above breakdown voltage for single photon detection (or group photon detection). After lowering the bias voltage to stop the avalanche by the quenching circuit, it takes some time to increase the bias again. The required time is called the dead time. In the Geiger mode, the average photon count cycle cannot be shorter than the dead time. If the photon detection cycle is close to the dead time, the number of detected photons is no longer proportional to the number of arrival photons. Besides, due to distortion of the histogram shape, a peak position can be shifted to shorter than true position. This effect becomes important when the photon detection cycle is less than 10 times the dead time.

Assuming a typical dead time of 50 ns, if photon detection cycle is less than 500 ns, the effect of distortion becomes important. This problem could occur in the case of short distance to a target or in bright sunshine, due to increase of photon detection rate.

Therefore, both too long and too short photon detection cycles are disadvantageous, due to photon shot noise and histogram distortion, respectively. It can be understood that the range of incident light intensity has to be limited for correct detection of TOF. A ratio of the upper and lower limitation represents the dynamic range of a photo detector, which is an important parameter especially for operation under outdoor conditions.

Figure 5:
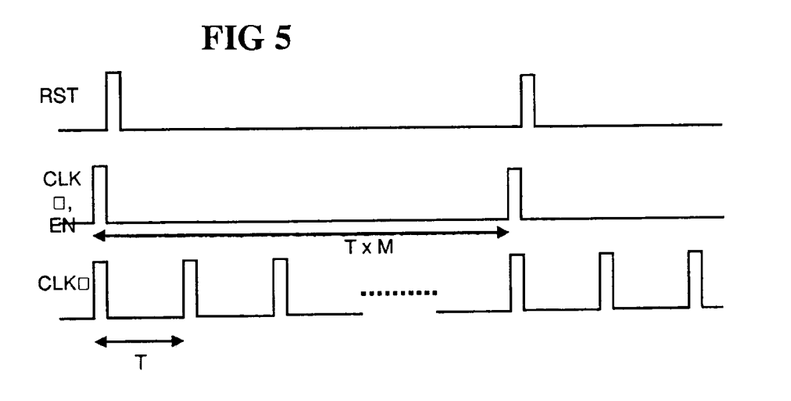
FIG. 5 shows a timing chart for a reset signal and two clock signals used in the embodiment of FIG. 3.

FIG. 5, Timing Chart for a Reset Signal and Clock Signals for Counting Pulses

In embodiments of this invention, it has been noted that an optical receiver is described capable of a photon counting mode and having a means to adjust the photon detection probability. A Geiger mode APD can be controlled by changing reverse bias voltage above breakdown voltage. The dynamic range is expanded by keeping the photon detection rate constant even when the incident light, and e.g. as well as noise level, is changed. A method to adjust reverse bias voltage based on photon detection rate will be explained using FIG. 3 and the timing chart of signals shown in FIG. 5. The counter 370 continues to count a pulse from the APD until a reset signal RST is input, based on CLK2 following a delay by delay element 365. The counted number is the photon detection number within the time of MT. When EN is input, the comparator compares the counted number with the predefined threshold N, and the Add signal is output if the counted number is larger and the Remove signal is output if not. When the "Add signal" is input to the charge pump, Vc is increased. On the contrary, when the "Remove signal" is input to the charge pump, Vc is decreased. Consequently, reverse vias voltage of the APD can be adjusted aiming to kept PLS output rate constant.

The capacitor has the function of stabilizing the variation of Vc. If the number of detected photons (or photon groups) is larger than N within the time MT, the reverse bias voltage is decreased and thus the photon detection probability is lowered, and vice versa. Therefore, it can be understood that the reverse bias is always adjusted, keeping the number of photons detected close to N. In principle, the input to the counter or to the comparator can be taken from any light detector that indicates an ambient light level. Since a photon detection number can be kept constant even when incident light is changed, a histogram peak can be correctly extracted, consequently the dynamic range can be expanded.

Figure 6:
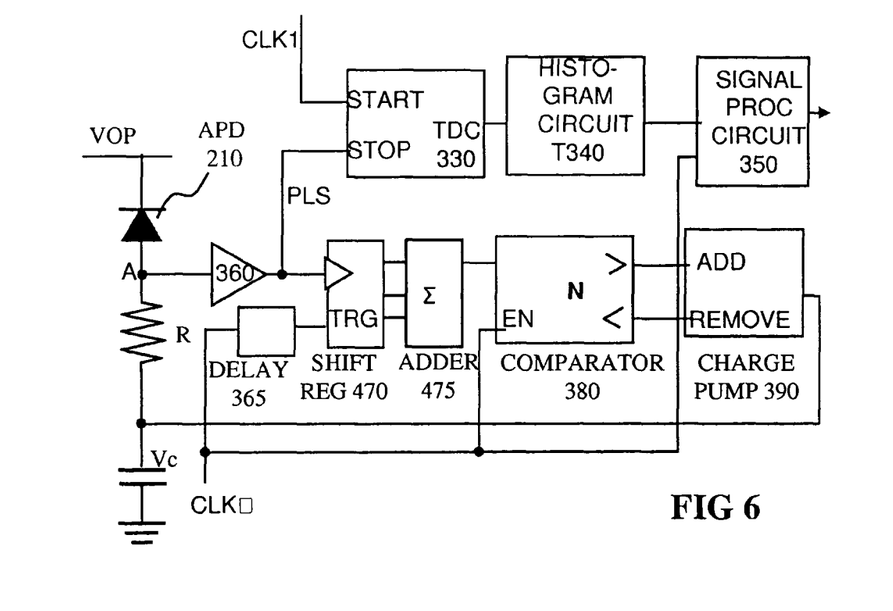
FIG. 6 shows an alternative configuration of a receiver for one of the pixels, using a shift register, according to another embodiment.

FIG. 6, Second Embodiment, Alternative Configuration of Receiver, Using Shift Register, A second embodiment is shown in FIG. 6. The counter in FIG. 3 is replaced with an M-bit shift register 470 and an adder 475. The CLK1 is delayed for one pulse by delay element 365 and is input to the shift register. The shift register is updated with a period of T. When a pulse is input from the APD, upper 1 bit becomes 1, and when the shift register is updated, the lower 1 bit is discarded. The M bit shift register is always storing the M latest periods of information denoting existence of a pulse. At every pulse illumination, the adder counts a number of bits set at 1, and outputs it to the comparator. Operation of the comparator is the same as that in FIG. 3, but the period of EN is T instead of MT. Consequently, an update period of Vc is shortened by a factor of M and it is capable of adjusting more rapidly to follow sudden changes of incident light, and e.g. as well as noise level.

Figure 7:
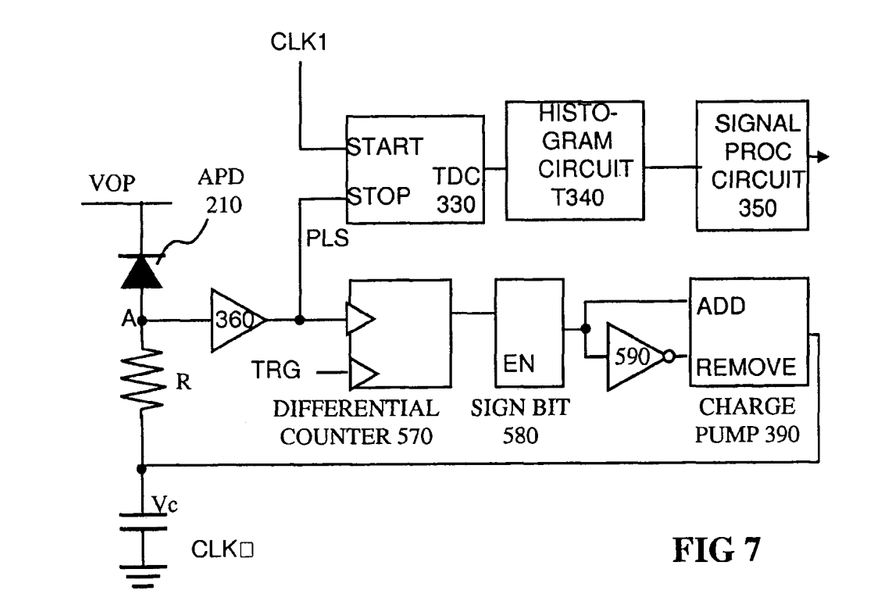
FIG. 7 shows a further alternative configuration of a receiver for one of the pixels, using a differential counter, according to another embodiment.

FIG. 7, Third Embodiment, Alternative Configuration Using Differential Counter

A third embodiment is shown in FIG. 7, in which the counter and comparator in FIG. 3 are replaced with a differential counter 570. The differential counter is incremented when a PLS from APD is input, and is decremented when a TRG is input. When EN is input, the sign of the counted number is output. If a photon detection cycle is longer than a TRG cycle, the accumulated count is positive, and Vc is lowered by the charge pump. Since the reverse bias voltage is increased, the photo detection probability is enhanced. If a photon detection cycle is shorter than a TRG cycle, the operation is reversed. Consequently, the reverse bias voltage can be controlled with the aim of equalizing the cycle of photon detection and TRG. The target cycle for photon detection can be easily set by changing the TRG cycle. Updating the cycle of Vc can also be done by changing a cycle of EN, and thus faster control of Vc is feasible. Besides, the circuit can be simplified, because the M bit shift register 470 in FIG. 6 is not necessary. The simplified circuit enables compact implementation in LSI. In the case of implementation as monolithic array of a photo detector, it can be very important to make compact an area of each pixel, for both fill factor and pixel number.

Implementation

Although described in terms of hardware circuits, some parts can be implemented in software in any computer language, run by conventional processing hardware such as a general purpose microprocessor, or application specific integrated circuits for example. For example, the controller according to embodiments of the present invention may be implemented as hardware, computer software, or combinations of both. The controller may include a general purpose processor, an embedded processor, an application specific integrated circuit (ASIC), a field programmable gate array (FPGA) or other programmable logic device, discrete gate or transistor logic, discrete hardware components, or any combination designed to perform the functions described herein. A processor may also be implemented as a combination of computing devices, e.g., a combination of an FPGA and a microprocessor, a plurality of microprocessors, one or more microprocessors in conjunction with an FPGA, or any other such configuration.

Figure 8:
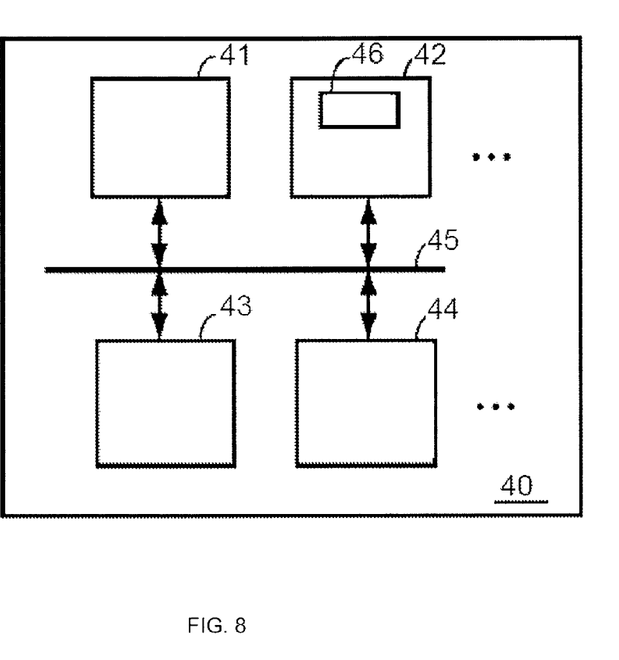
FIG. 8 shows one configuration of processing system that can be used with any embodiment of the present invention.

As indicated above the present invention also provides a processor system for use in the present invention. The processing system may include a computing device or processing engine, e.g. a microprocessor. Any of the methods described above according to embodiments of the present invention or claimed may be implemented in a processing system 40 such as shown in FIG. 8. FIG. 8 shows one configuration of processing system 40 that includes at least one customisable or programmable processor 41 coupled to a memory subsystem 42 that includes at least one form of memory, e.g., RAM, ROM, and so forth. It is to be noted that the processor 41 or processors may be a general purpose, or a special purpose processor, and may be for inclusion in a device, e.g. a chip that has other components that perform other functions. Thus, one or more aspects of the method according to embodiments of the present invention can be implemented in digital electronic circuitry, or in computer hardware, firmware, software, or in combinations of them. The processing system may include a storage subsystem 43 that has at least one disk drive and/or CD-ROM drive and/or DVD drive. In some implementations, a display system and a keyboard may be included as part of a user interface subsystem 44 to provide for a user to manually input information, such as parameter values. Ports for inputting and outputting data may be included. More elements such as network connections, interfaces to various devices, and so forth, may be included, but are not illustrated in FIG. 8. The various elements of the processing system 40 may be coupled in various ways, including via a bus subsystem 45 shown in FIG. 8 for simplicity as a single bus, but which will be understood to those in the art to include a system of at least one bus. The memory of the memory subsystem 42 may at some time hold part or all (in either case shown as 46) of a set of instructions that when executed on the processing system 40 implement the steps of the method embodiments described herein.

The software may be adapted to read from or write to a memory device such as a shift register (470) arranged to store a record of each of the pulses during a predefined duration.

Such a computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. An optical rangefinder based on time-of-flight measurement, comprising
    an illumination device radiating pulsed light toward an object, and having a light receiver arranged to receive light from the object, wherein the light receiver is configured to operate in a photon counting mode, and to generate a pulse for a detected photon and requiring a variable probability of a photon detection on the light receiver; and
    a controller, wherein the controller is configured to control the photon detection probability of the receiver based on a light level output from the light receiver contemporaneously with real-time range-finding measurements.

2. The optical rangefinder of claim 1, the controller comprising an input from an output of the receiver to indicate the light level, as well as optionally any kind of noise level.

3. The optical rangefinder of claim 1, the controller comprising a device configured to count the pulses over a period of time and compare the count with a threshold, the controller being further configured to use the output of the comparison to increase or reduce the photon detection probability.

4. The optical rangefinder of claim 1, the receiver comprising an optical receiving component having a means for changing the photon detection probability, and wherein the controller is arranged to control the photon detection probability by changing the photon detection probability.

5. The optical rangefinder of claim 4, the optical receiving component comprising an avalanche photo diode, and wherein the controller is arranged to control the photon detection probability by changing a reverse bias voltage of the avalanche photo diode.

6. The optical rangefinder of claim 1, further comprising a memory configured to store a record of each of the pulses during a predefined duration, an adder configured to total the pulses recorded in the memory, and a comparator configured to compare an output of the counter with a threshold.

7. The optical rangefinder of claim 6 wherein the memory is a shift register configured to store a most recent record of each of the pulses during a predefined duration.

8. The optical rangefinder of claim 1, and having a differential counter configured to increment a count number when the pulse from the receiver is input, and to decrement a count number at intervals of a predefined duration.

9. The optical rangefinder of claim 1, comprising a histogram circuit configured to distinguish wanted signals from noise according to a histogram, and to determine a time of flight of the wanted signals.

10. A method of using a receiver adapted to receive pulsed light from an object generated by radiating pulsed light towards the object, the method comprising:
   operating the receiver in a photon counting mode, so as to generate a pulse for a detected received photon of the received light, there being a variable probability of a photon detection on the receiver; and
   controlling the photon detection probability of the receiver, based on a light level from the receiver contemporaneously with real-time range-finding measurements.

11. The method of claim 10 further comprising determining a time of flight of the light received.

12. The method of claim 10, further comprising counting the pulses over a period of time and comparing the count with a threshold; and
   increasing or reducing the photon detection probability in response to the output of the comparison.

13. The method of claim 10, further comprising storing a most recent record of each of the pulses during a predefined duration.

* * * * *